United States Patent Office 3,801,555
Patented Apr. 2, 1974

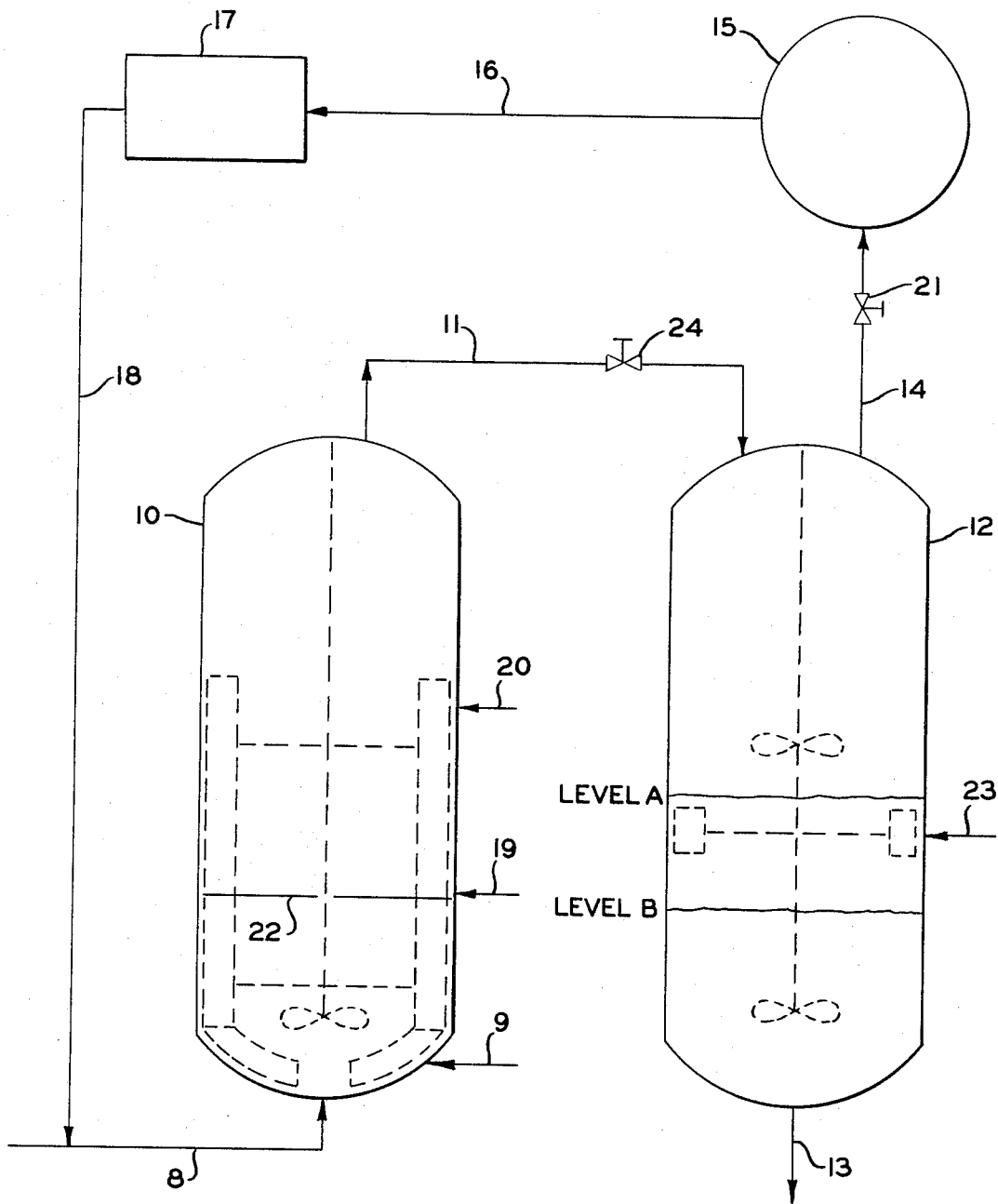

3,801,555
MASS POLYMERIZATION OF CONJUGATED DIENES WITH ORGANO LITHIUM CATALYSTS
Charles R. Johnson, Akron, Ohio, assignor to The Firestone Tire & Rubber Company, Akron, Ohio
Continuation-in-part of application Ser. No. 59,221, July 29, 1970, now Patent No. 3,681,304, dated Aug. 1, 1972. This application May 17, 1972, Ser. No. 253,946
The portion of the term of the patent subsequent to Aug. 1, 1989, has been disclaimed
Int. Cl. C08d 1/32, 3/08; C08f 19/08
U.S. Cl. 260—83.7
7 Claims

ABSTRACT OF THE DISCLOSURE

Butadiene and/or isoprene, optionally with styrene, are mass polymerized continuously by introducing at least part of the monomer and a lithium-based initiator into the bottom region of an elongated, vertical, pressurized reaction vessel. The materials are agitated, and additional monomer, if any, is introduced into the reaction vessel as the materials flow from the bottom to the top of the reaction vessel, through a throttle valve, and then into a second vessel. At least a major portion of the heat of reaction is contained within the reaction vessel. A portion of unreacted monomer vapor is removed from the second vessel to control the pressure and temperature within it; in this manner the pressure, and hence the temperature in the reaction vessel are controlled to permit some boiling in the top of the reaction vesesl. The boiling produces agitation, and the removal of vapor raises the solids content of the materials. The throttle valve can be partially closed to increase the pressure in the reaction vessel. Monomer vapors removed are condensed and recycled, and the remaining material is discharged from the second vessel.

CROSS-REFERENCE TO RELATED APPLICATION

This application is a continuation-in-part of my copending application Ser. No. 59,221, filed July 29, 1970 and issued Aug. 1, 1972 as U.S. Pat. 3,681,304.

BACKGROUND OF THE INVENTION

This invention relates to a method of mass polymerizing butadiene-1,3 and/or isoprene, optionally with styrene, using a lithium-based initiator.

Polymerization processes of this type, either continuous or batch processes, have encounterd a number of problems. Among these are heat transfer problems, and the problem of separating unreacted monomers from the polymer. Suggested solutions to these problems have been many and varied.

Since the polymerization reaction is exothermic, heat transfer problems arise in removing heat from the polymerization zone. For this purpose reactors which are jacketed or equipped with internal cooling coils are employed. In addition to design complications, jackets or coils require a supply of coolant fluid. Additionally, heat transfer is poor when viscous polymer solutions are encountered.

Autorefrigeration has been suggested as a technique for cooling a polymerization reaction mixture. Such technique involves distilling a portion of lower boiling constituents from the mixture. However, this technique as a practical matter cannot be used whenever, as often occurs, the polymerization mixture is viscous and foams excessively upon boiling.

When unreacted monomers have been removed from the polymer, they normally contain catalyst-inactivating materials which have been added as a consequence of the physical separation of the volatile material from the polymer or to halt the polymerization reaction. These materials must be removed from the recovered unreacted monomers before the monomers can be recycled to the polymerization zone. This necessary purification of the recovered materials has usually been accomplished in separate purification facilties, thus adding to the cost of manufacturing the polymer.

In general, prior art systems for such polymerizations have first removed heat from the system to control the reaction and then supplied heat in order to separate unreacted monomers from the polymer. Such opposing practices are necesarily wasteful. Mass polymerization processes have the additional problems of controlling "runaway" or uncontrolled reactions, and of foaming of the polymerizate solution as unreacted monomer vaporizes.

There exists, therefore, a need for a continuous mass polymerization process which can avoid or minimize the various problems and undesirable practices described above.

SUMMARY OF THE INVENTION

It is an object of this invention to provide a method for continuously mass polymerizing monomer consisting essentially of butadiene-1,3, and/or isoprene, optionally with styrene, which is suitable for large-scale production of polymers with a minimum of difficulty.

The invention is summarized as follows: At least part of the monomer is introduced continuously into the bottom region of an elongated, vertical, pressurized reaction vessel, along with a lithium-based initiator. The introduced materials are agitated to insure intimate mixing in at least the bottom portion of the reaction vessel, and the remaining monomer, if any, is added at at least one intermediate point in the vessel. At least a major portion of the heat produced by the exothermic polymerization reaction remains in the reaction medium, although a minor portion can be removed. At the top of the reaction vessel the materials continuously proceed through a line into a second vessel. A portion of the vapor present in the second vessel is removed to control the pressure in the second vessel. By throttling a valve in the line connecting the two vessels the pressure in the reaction vessel is thus controlled at a higher pressure, and yet boiling off of a portion of the volatile materials in the reaction vessel is permitted. As a result, the temperature in the reaction vessel is regulated; the boiling in the upper portion of the reaction vessel aids agitation; and the solids content of the materials leaving the reaction vessel is increased.

The vapor portion removed from the second vessel is continuously condensed and recycled directly to join an entering monomer stream; and the remaining materials in the second vessel react at a slower rate with controlled foaming, and are continuously discharged from the second vessel.

The materials discharged from the bottom of the second vessel are polymer and unreacted monomer. This mixture can be further treated in a known manner to remove the monomer and add antioxidant, if desired, to convert the polymer to a commercially acceptable form.

Optionally, additional or different monomer can be added to the second vessel, in order to add a copolymer segment to the polymer formed in the reaction vessel. Any of the monomers cited can be added for this purpose, depending on the nature of the desired segment addition.

As a further option, the reaction vessel can be equipped with a baffle, located part-way up the vessel, which minimizes vertical mixing. In this way, a segment of uniform copolymer can be formed from the monomers charged at the bottom of the reaction vessel, with copolymer segments added by subsequent monomer additions above the baffle. Optional jacketing can also be provided to remove heat from the reaction vessel.

A more complete understanding of the invention may be obtained by reference to the accompanying drawings, and to the following examples and detailed descriptions.

BRIEF DESCRIPTION OF THE DRAWING

The drawing shows a flow sheet, diagrammatically representing the method of the invention.

DESCRIPTION OF THE PREFERRED EMBODIMENTS OF THE INVENTION

Referring to the drawings, at least part of the monomer is fed through line 8 into the bottom region of a reaction vessel 10. Optional jacketing (not shown) of reaction vessel 10 can provide for heat removal. A solution of the initiator in a hydrocarbon liquid is added through line 9. At points part way up the reactor, additional monomer (cooled if desired to take up heat) is optionally added through lines 19 and 20. The mixture of polymer and liquid and vaporized unreacted monomer passes out the top of the reaction vessel 10 through line 11 and throttle valve 24 into a second vessel 12. Vessels 10 and 12 are referred to as the reaction vessel and the second vessel, respectively, although substantial polymerization can occur in the second vessel as well. Vapor is removed from second vessel 12 through line 14 containing a pressure regulating valve 21 into a condenser 15, and the condensate is passed through line 16 into a tank 17, then through line 18, to recycle it through the system. The remaining materials in the second vessel 12 are discharged continuously through line 13 at the bottom of vessel 12 and sent for further processing (not shown).

Optionally the pressure in the second vessel 12 may be controlled by locating the pressure regulating valve 21 in a vent line tied to either the condenser 15 or tank 17 in lieu of its position in line 14.

An optional baffle 22 is shown part-way up the reaction vessel. Conventional turbine, and scraped-surface agitators are indicated by dotted lines. Additional monomer can be added to the second vessel at point 23, which monomer can be precooled to a temperature substantially below that of the reacting materials, thereby to slow the reaction and avoid excessive foaming in the second vessel. Little or no foam is formed on release of vapor as the mixture falls into the second vessel.

Level A shown in the second vessel 12 is employed when additional monomer is added at point 23. If no additional monomer is to be added in second vessel 12, the liquid can be maintained at level B to provide additional free space in second vessel 12.

STARTING MATERIALS

As previously indicated, the preferred monomers of the invention are butadiene-1,3 and/or isoprene and/or styrene. The method may be employed to produce butadiene or isoprene homopolymers, copolymers of butadiene and isoprene, copolymers of butadiene-1,3 or isoprene and styrene, or copolymers from all three monomers.

The initiator has been defined as a "lithium-based initiator." This definition includes hydrocarbon-lithium materials corresponding to the formula $R(Li)_x$ where R is an aliphatic, cycloaliphatic or aromatic hydrocarbon radical, and $x$ is an integer from 1 to 4, inclusive. The R in the formula preferably contains from 1 to 20 carbon atoms. Among the many compounds corresponding to the general formula $R(Li)_x$ are such suitable compounds as methyllithium, ethyllithium, isopropyllithium, amyllithium, hexyllithium, tert-octyllithium, n-decyllithium, cyclohexyllithium, allyllithium, methallyllithium, phenyllithium, naphthyllithium, p-tolyllithium, 4-butylphenyllithium, 4-phenylbutyllithium, dilithiomethane, 1,4-dilithiobutane, 1,10-dilithiodecane, 1,4-dilithiocyclohexane, 1,4-dilithio-2-butene, 1,4-dilithiobenzene, 1,5-dilithionaphthalene, 1,3,5-trilithiopentane, 1,3,5-trilithiocyclohexane, 1,3,5-trilithiobenzene, 1,2,3,5-tetralithiocyclohexane, 1,3,5,8-tetralithiodecane, 1,5,10,20-tetralithioeicosane, and the like. Likewise, there may be employed the lithium polynucelar aromatic hydrocarbon adducts of lithium, such as lithium-stilbene adduct. Mixtures of two or more of the above compounds or adducts can also be employed. Especially preferred is n-butyllithium.

The initiator is used at the level required to neutralize any impurities present and to produce the desired product molecular weight. Theoretically, each molecule of initiator should produce a molecule of polymer, so the initiator level should be the reciprocal of the desired molecular weight, in moles of initiator per mole of reacted monomer. Consumption of the catalyst by impurities (if any) and the possibility of chain-transfer can require an adjustment in the amount of initiator required. In general, however, from 0.001 to 1 millimole of initiator is required, per mole of monomer to be polymerized. From 0.005 to 0.5 millimole of initiator per mole of monomer is preferred.

A modifier can be used, if desired, and the use of from 50 to 5,000 parts by weight of butadiene-1,2 per million parts of butadiene-1,3, is especially preferred for this purpose.

CHARGING

It has been pointed out that the incoming materials can be charged to the system in a number of ways according to the method of the invention. In addition to those materials charged at the bottom of the reaction vessel, monomer can be charged at intermediate points in the reaction vessel, and at points below the liquid surface of the second vessel. The different points of addition can be used to advantage, depending on the nature of the desired product.

The introduction of a portion of the monomer at at least one intermediate point in the reaction vessel is especially recommended when the method of the invention is used to produce copolymers from monomers having differing reaction rates, as is the case with styrene-butadiene-1,3-copolymers. The technique in this case is effective in preventing formation of block polystyrene in the polymer, an undesirable material in many end-use applications although it may be valuable in others. It is hypothesized that the delayed addition of the butadiene-1,3-(the faster reacting monomer in this case) permits the copolymerization of styrene and butadiene-1,3 to occur early in the reaction period, thus avoiding the presence of styrene monomer alone in the system. Since the styrene monomer normally must be accompanied by butadiene-1,3 monomer, conditions favor production of the copolymer without styrene homopolymer blocks.

As a practical matter, it has been found that in mass polymerization only a limited amount of styrene can be easily incorporated into a copolymer with butadiene-1,3. The reason for this fact is that the slower reaction rate of styrene in the presence of butadiene-1,3 is intensified at the lower temperatures used in mass polymerization work. Thus a content of only about ten percent styrene can be practically incorporated into a copolymer segment with butadiene-1,3. Even this small amount can impart desirable properties in the polymer for some applications. To incorporate a maximum amount of styrene in a butadiene-styrene copolymer segment, a high styrene-to-butadiene monomer charge is introduced to the bottom of the reaction vessel. (If only styrene monomer were initially charged, polymerization would proceed very rapidly, and the resultant temperature rise would cause the reaction to "run away" in an uncontrolled manner unless a very low temperature and low rate of reaction were used to initiate polymerization.) The horizontal baffle, mentioned above, would be employed, with jacketing in the vessel walls below the baffle to provide for heat removal. Additional butadiene is then added just above the baffle. The copolymer segment thus formed is of relatively low molecular weight, but additional butadiene homopolymer is added to the segment above the baffle.

When either isoprene or butadiene-1,3 is the sole monomer charged, the incremental addition need not be made, and all the monomer can be charged initially, at the bottom of the reaction vessel. However if desired cooled monomer incremental additions can be made to take up some heat of reaction.

Addition of initiator is preferably made in a dispersion or solution in a liquid hydrocarbon diluent, with sufficient diluent such as hexane to permit fast mixing and approach a perfect dispersion of the initiator in the monomer mixture. If the use of such a liquid hydrocarbon is undesirable, the initiator can be added in solution to a portion of cold monomer, kept below the temperature at which any appreciable polymerization will occur.

The temperature of all the materials charged is controlled by cooling or heating them, by means of heat-exchangers, as required. Since the temperature of these materials will affect the initial polymerization rate, as well as the heat contained in the entire system, temperature control of charged material is important. The materials can be charged at temperatures varying from $-50°$ to $+50°$ C., preferably $10°$ to $30°$ C., and are often charged at ambient temperature. All materials can be charged at the same temperature, or the temperatures of different streams may differ.

POLYMERIZATION CONDITIONS

The reaction vessel 10 is elongated and vertical. This configuration facilitates the smooth upward flow of the charged materials from the bottom to the discharge region at the top. In order to obtain such flow, without excessive top-to-bottom displacement by the agitation, the reaction vessel should have a vertical height which is at least 1.5 times its diameter and preferably at least twice its diameter. Any upper limitation on the height-to-diameter ratio is imposed only by practical considerations of obtaining adequate agitation and entry into the vessel for cleaning purposes.

Agitation in both vessels 10 and 12 should be provided, especially in the reaction vessel 10. At the bottom of reaction vessel 10 a thorough rapid mixing of the entering materials is quite important to insure against uncontrolled polymerization, either at too fast or too slow a rate. Optional jacketing (not shown in the drawing) can remove heat from reaction vessel 10 by use of a fluid cooling medium contained therein. A so-called "scraped-surface" agitator is preferably employed, at least in those regions where monomer or other materials are being added, to avoid "dead spots" at the vessel walls. At the bottom of the reaction vessel the mixture contains a relatively low proportion of polymer to diluent, thus is quite fluid and conductive to good mixing. Staged turbine agitators are sufficient for adequate mixing in other regions of the two vessels. Since vertical mixing is minimized with scraped-surface agitation, its use is especially preferred in the reaction vessel.

Exclusion from the process of materials harmful to the lithium-based initiator is especially important. These materials include water, oxygen, carbon dioxide and other similar materials which "kill," or de-activate the initiator. The incoming monomers are preferably treated to remove such impurities.

Temperatures utilized in the method of the invention should be generally at a relatively lower level than in processes which use a diluent. A temperature profile of the reaction vessel shows that the bottom region of the vessel is at the lowest temperature, preferably from about $15°$ C. up to $40°$ C. As the entering materials are combined, the polymerization reaction is initiated, and the heat of polymerization raises the temperature of the materials to the controlled boiling point of the monomer or monomers at the established pressure.

If additionally charged monomer is employed, it can be added at a lower temperature to aid in temperature control as the mixture flows upwards through the reactor. Near the top of the reaction vessel 10 the temperature reaches its desired peak of about $35°$ to about $75°$ C., preferably about $45-60°$ C. As the peak temperature reaches the boiling point of the volatile materials in the mixture, vaporization of a portion of the volatiles effectively limits the temperature thus providing reaction control by autorefrigeration. From about 10% to about 35% of the monomer will normally be polymerized in the reaction vessel, producing a solution of polymer in unreacted monomer which is sufficiently fluid to be handled. The viscosity of the solution will depend on a variety of factors, such as the composition and molecular weight of the polymer.

Although heat can be removed from reaction vessel 10 if desired by means of a jacket, the amount of heat removed would be only a minor portion thereof because of the high viscosity and poor heat transfer of the solution of polymer in unreacted monomer. The method of the invention is designed to work most advantageously if substantially no heat is removed from the vessels 10, 12 and line 11, thus avoiding the heat transfer problems associated therewith. In addition, the retention of the heat of reaction within the vessels allows this heat to be used as a driving force in removing unreacted monomer from the polymer mixture. As an added advantage, the boiling of the mixture near the top of the vessel 10 provides agitation in that region of vessel 10 where the mixture is most viscous. Insulation of vessels 10 and 12 and the connecting line can be provided, if desired, to improve heat retention in the system.

As indicated above, the control of the pressure in the method of the invention is quite important. Control is basically accomplished by regulation of valve 24 in line 11 and valve 21 in line 14 between the second vessel and the condenser (which valve can be regulated automatically or manually) to permit removal of sufficient vapor from the second vessel 12 to control the pressure therein as desired. The line connecting the two vessels is equipped with valve 24, to allow the pressure differential between the vessels to be increased. With valve 24 fully open, the pressure differential between the vessels is slight, on the order of as little as 0.01 atmosphere, caused by fluid friction. Differentials up to 3 atmospheres or higher can be employed, if desired.

The reaction vessel is normally maintained essentially completely full of liquid, although vaporization of the volatile materials occurs in the upper portion of the reaction vessel to the extent desired by establishing its pressure with consideration being given to the relationships of temperature and partial pressures of the volatiles. The additional fluid head in the lower portions of the reaction vessel suppresses boiling in this region even though temperatures approach the peak temperature. The second vessel is only partially filled with the liquid materials, with a vapor space in the top portion permitting removal of vapor near the top without entrainment of the liquid.

The vapors removed from the top of the second vessel contain unreacted monomers and a portion of a modifier material, if it is used. These vapors are liquified by cooling, and are then recycled directly to join an entering monomer stream, either at the bottom of the reaction vessel or at another introduction point.

The materials leaving the bottom of the second vessel can be subjected to further operations to remove the remaining volatile materials, in any of a number of known systems. If significant amounts of unreacted styrene monomer remain, vacuum steam-distillation can be employed to remove the styrene at acceptable temperatures. Small amounts of styrene, such as two or three percent, or less, can be completely polymerized by application of heat during the finishing step. Flash-drying procedures are effective for devolatilizing if the remaining monomers are butadiene and/or isoprene.

The polymers recovered can be employed in the manufacture of tires, belts, hose, high-impact polystyrene and ABS base plastics or resins or other products. In the final steps of recovering the polymers it is customary to add an antioxidant to protect the polymer. In their end use, the polymers are normally compounded with vulcanizing ingredients, carbon black and other known rubber-compounding materials.

The method of the invention may be better understood by reference to the following examples, in which all parts and percentages are by weight, unless otherwise indicated.

EXAMPLE I

To produce a butadiene homopolymer, a stream of dried and purified butadiene-1,3 was passed through a heat-exchanger to bring it to approximately 15° C. The stream was injected with enough butadiene-1,2 to provide 500 parts per million of butadiene-1,2 based on the total charge of butadiene-1,3. This butadiene stream was introduced into the bottom region of a reaction vessel whose height was approximately three times its diameter. At another point near the bottom of the reaction vessel, a solution of a n-butyllithium initiator in a small amount of hexane was also added. The reaction vessel was equipped with a "scraped-surface" agitator which provided excellent agitation especially in the region of initiator addition.

As the charged materials were quickly mixed the polymerization reaction began immediately.

After the reaction came to equilibrium, the temperature in the lower portion of the reaction vessel was about 30° C.; and at the top, about 55° C. Boiling-off of butadiene occurred near the top of the reaction vessel, where the temperature was highest and the fluid head the least.

The materials left the top of the reaction vessel as a viscous "cement" of polymer dissolved and/or suspended in the unreacted butadiene-1,3. At the concentration and temperature employed, some phase separation of the reaction mixture occurred, and the materials flowed through a throttle valve and a line into the top of the second vessel in "plugs" of viscous cement, separated by pockets of vapor, and lubricated by the separated butadiene. Only a small degree of foaming was noted as the materials fell into the second vessel, maintained about ¼ full of liquid. The pressure in the second vessel was maintained at approximately 5.5 atmospheres; and by throttling the valve in the connecting line, the pressure in the reaction vessel was maintained at about seven atmospheres.

Approximately 12% of the butadiene monomer charged was converted to polymer in the reaction vessel, and additional polymerization continued in the second vessel. About 31% of the butadiene charged was vaporized and removed from the second vessel; this material was then condensed, cooled to 15° C. and re-cycled to the reaction vessel.

An additional 3% of the charged monomer was polymerized in the second vessel, which was maintained at 50° C., making a total conversion of 15%. Since 31% of the monomer was flashed off and removed, the polymer content of the materials removed from the bottom of the second vessel was 21.7%. These materials were subjected to further drying operations to remove the rest of the monomer.

No heat was intentionally removed from the system, although some heat was lost because of uninsulated portions of the vessels and connecting line. Calculations were made using a figure of 320 calories per gram for the heat of polymerization, 90 calories per gram for the heat of vaporization of butadiene-1,3, and a figure of 0.55 calorie per gram per degree centigrade for the specific heat of both butadiene monomer and polymer. Based on 100 grams of charged monomer, the production of 15 grams of polymer gave 4800 calories. The vaporization of 31 grams of monomer required 2790 calories, and the increase of temperature from 15° C. to 50° C. required 1920 calories, for a total heat requirement of 4710 calories. The remaining 90 calories are assumed to have been lost to the surroundings.

EXAMPLE II

The procedure of Example I is repeated, except that styrene monomer is charged initially at the bottom of the reaction vessel. The reaction vessel is equipped with a horizontal baffle, and butadiene-1,3 is added just above the baffle. Additionally, more butadiene-1,3 monomer is charged in the second vessel. The polymer recovered is a two-segment copolymer of the composition: (styrene/butadiene), with a total styrene content of 10% with most of the styrene contained in the first segment. In tire tread formulations, this polymer shows greater wet traction than tread formulations made from butadiene homopolymer.

EXAMPLE III

The procedure of Example II is repeated, except that instead of styrene, isoprene is charged initially. The recovered polymer is an (isoprene/butadiene) two-segment copolymer.

What is claimed is:

1. The method of polymerizing monomer consisting essentially of butadiene-1,3 and/or isoprene, optionally with styrene, comprising the steps of continuously introducing into the bottom region of an elongated, vertical, pressurized reaction vessel at least part of the monomer and from 0.001 to 1 millimole per mole of total monomer charged of a lithium based initiator which is a polynuclear aromatic hydrocarbon adduct of lithium or a compound of the formula $R(Li)_x$, where R is an aliphatic, cycloaliphatic or aromatic radical containing from 1 to 20 carbon atoms and $x$ is an integer from 1 to 4 inclusive, agitating the introduced materials to insure intimate mixing in at least the bottom portion of the reaction vessel, and continuously adding the remaining monomer, if any, at at least one intermediate point in the reaction vessel, while containing at least a major portion of the heat produced by the exothermic polymerization reaction within the reaction vessel, allowing the materials to flow continuously from the top of the reaction vessel through a throttle valve, into a second vessel, removing at least a portion of vapor from the second vessel to control the pressure and temperature of polymer mixture in the second vessel and partially closing the throttle valve thereby controlling the pressure in the reaction vessel at 0.01 to 3 atmospheres higher than the second vessel so as to permit boiling off a portion of the volatile materials in the reaction vessel, whereby the peak temperature of the reaction vessel is regulated at 35° to 75° C., the upper portion of the reaction vessel is agitated, and the solids content of the mixture is increased, condensing the vapor, and recycling the condensate to the reaction vessel, and continuously discharging the remaining materials from the second vessel.

2. The method of claim 1, wherein the monomer is butadiene-1,3.

3. The method of claim 1, wherein the monomer consists of butadiene-1,3 and styrene.

4. The method of claim 3, wherein the polymer produced is a copolymer of butadiene-1,3 and styrene.

5. The method of claim 1, wherein the lithium-based initiator is n-butyllithium.

6. The method of claim 1, wherein additional monomer is added to the second vessel at a point below the liquid level.

7. The method of claim 6, wherein the part of the monomer introduced into the bottom of the reaction vessel is styrene, the remaining monomer charged into the reaction vessel at one intermediate point is butadiene-1,3, or isoprene, and the additional monomer added to the second vessel is butadiene-1,3 or isoprene.

References Cited

UNITED STATES PATENTS

| 2,443,817 | 6/1948 | Draeger et al. | 260—94.9 M |
| 3,506,628 | 4/1970 | Hopkins | 260—95 |
| 3,681,304 | 8/1972 | Johnson | 260—880 |

JAMES A. SEIDLECK, Primary Examiner

U.S. Cl. X.R.

260—80.7, 82.1, 94.2 M

UNITED STATES PATENT OFFICE
CERTIFICATE OF CORRECTION

Patent No. 3,801,555      Dated April 2, 1974

Inventor(s) Charles R. Johnson

It is certified that error appears in the above-identified patent and that said Letters Patent are hereby corrected as shown below:

In Column 5, Line 15, "to" should be --in--.

In Column 5, Line 15, the word cold should be in quotation marks.

In Column 5, Line 56, "conductive" should be --conducive--.

Signed and sealed this 17th day of September 1974.

(SEAL)
Attest:

McCOY M. GIBSON JR.
Attesting Officer

C. MARSHALL DANN
Commissioner of Patents